US010268243B2

United States Patent
Zhang

(10) Patent No.: US 10,268,243 B2
(45) Date of Patent: Apr. 23, 2019

(54) CONNECTOR AND AN ELECTRONIC DEVICE HAVING THE SAME

(71) Applicant: Lenovo (Beijing) Co., Ltd., Beijing (CN)

(72) Inventor: Xin Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/726,967

(22) Filed: Jun. 1, 2015

(65) Prior Publication Data

US 2016/0161993 A1    Jun. 9, 2016

(30) Foreign Application Priority Data

Dec. 8, 2014    (CN) .......................... 2014 1 0743767

(51) Int. Cl.
*E05D 3/12* (2006.01)
*G06F 1/16* (2006.01)
*F16C 11/04* (2006.01)

(52) U.S. Cl.
CPC ............ *G06F 1/1681* (2013.01); *F16C 11/04* (2013.01); *G06F 1/1637* (2013.01); *E05D 3/122* (2013.01); *E05Y 2900/606* (2013.01)

(58) Field of Classification Search
CPC .... G06F 1/1681; G06F 1/1616; G06F 1/1662; G06F 1/1613; G06F 1/1637; E05D 7/06; E05D 3/122; F16C 11/04; E05Y 2900/606

See application file for complete search history.

(56) References Cited

U.S. PATENT DOCUMENTS

| 4,834,329 | A  | * | 5/1989 | Delapp ................. F16M 11/10 248/183.3 |
|---|---|---|---|---|
| 6,191,937 | B1 | * | 2/2001 | Bang ..................... G06F 1/1681 16/354 |
| 8,243,459 | B2 | * | 8/2012 | Hoshino .............. G06F 1/1616 361/715 |
| 8,720,011 | B1 | * | 5/2014 | Hsu ........................ E05D 3/122 16/354 |
| 9,268,372 | B1 | * | 2/2016 | Hsu ....................... G06F 1/1681 |

(Continued)

FOREIGN PATENT DOCUMENTS

| CN | 201386735 Y | 1/2010 |
|---|---|---|
| CN | 101840247 A | 9/2010 |

(Continued)

OTHER PUBLICATIONS

First Office Action dated Aug. 29, 2018 (14 pages) out of Chinese priority Application No. 2014107437673.

*Primary Examiner* — David M Sinclair
*Assistant Examiner* — Theron S Milliser
(74) *Attorney, Agent, or Firm* — Brinks Gilson & Lione; John C. Freeman

(57) ABSTRACT

A connector and an electronic device having the connector are described. The connector includes a first connecting sheet and a second connecting sheet, each having a connecting portion and a non-connecting portion, wherein, each of the connecting portions of the first and second connecting sheets includes a plurality of teeth for mutual engagement and cooperation to effect a relative rotary motion of the first and second sheets, and each of the non-connecting portions of the first and second connecting sheets includes an external planar surface.

18 Claims, 4 Drawing Sheets

(56) References Cited

U.S. PATENT DOCUMENTS

| | | | |
|---|---|---|---|
| 2010/0232100 A1* | 9/2010 | Fukuma | F16G 13/18 361/679.01 |
| 2011/0000136 A1* | 1/2011 | Brun | E05D 3/06 49/358 |
| 2012/0096678 A1 | 4/2012 | Zhang et al. | |
| 2013/0219663 A1* | 8/2013 | Cai | G06F 1/1681 16/371 |
| 2015/0023030 A1* | 1/2015 | Tsukamoto | G06F 1/1652 362/419 |
| 2015/0277506 A1* | 10/2015 | Cheah | G06F 1/1681 361/679.27 |
| 2015/0361696 A1* | 12/2015 | Tazbaz | H04M 1/022 361/679.27 |
| 2015/0362956 A1* | 12/2015 | Tazbaz | G06F 1/1637 361/679.27 |
| 2015/0370286 A1* | 12/2015 | Zhang | G06F 1/1624 361/679.27 |
| 2016/0060931 A1* | 3/2016 | Zhang | E05D 3/12 361/679.55 |

FOREIGN PATENT DOCUMENTS

| | | |
|---|---|---|
| CN | 103899637 A | 7/2014 |
| CN | 203926362 U | 11/2014 |

* cited by examiner

CONNECTOR AND AN ELECTRONIC DEVICE HAVING THE SAME

This application claims priority to Chinese Patent Application No. 201410743767.3 filed on Dec. 8, 2014 the entire contents of which are incorporated herein by reference.

BACKGROUND

The present disclosure relates to a connector and an electronic device with the connector.

Connectors are widely used in various devices, for realizing the mutual rotation between the first part and the second part of the device. However, in many cases, the requirements to the rotating connector are not limited to realizing mutual rotation between two parts. For example, for a laptop, since its connector (also known as "the rotating shaft mechanism") between its display part and the keyboard part can be observed and touched by the user, desirably, the connector should have pleasing appearance and good feeling to touch; otherwise it will affect the user experience, thereby affecting the market of the entire product. However, existing products still have large room to improve in the aforementioned aspects.

Thus, there is a demand to provide an improved connector which has a pleasant appearance to the user, and the connector has smooth surface so that the user feels good when touching it and the connector undesirably scratching the user or the support surface such as a desktop may be prevented. In addition, the improved connector should be simple and easy to be manufactured. Accordingly, it is desirable to provide a device, such as an electronic device, having the improved connector as mentioned above.

In addition, with the growing popularity of pad-type electronic devices, people more and more use them, for example, to watch videos. People have more requirements for the support of the pads, for example, the support should keep the electronic device easily and stably at any angle or in any posture. Therefore, the support usually has a connector, however, regarding efficiency and stability of keeping the devices at a desired angle, the current connectors of the support still have room to improve. In addition, a simple structure, pleasant appearance and ease of use, etc, are also desirable, otherwise, the user experience to the support and even to the related electronic device provided with such support will become worse.

Thus, there is a demand to provide an improved support for the pad-type electronic devices, and the support can overcome at least some or all of the aforementioned disadvantages.

SUMMARY

In a preferred embodiment of the present disclosure, it is provided a connector a first connecting sheet and a second connecting sheet, each comprising a connecting portion and a non-connecting portion, wherein, each of the connecting portions of the first and second connecting sheets includes a plurality of teeth for mutual engagement and cooperation to effect a relative rotary motion of the first and second sheets, and each of the non-connecting portions of the first and second connecting sheets includes an external planar surface.

In another embodiment of the present disclosure, it is provided an electronic device, comprising: a main body; a support body for supporting the main body; and the connector according to the claim rotatably connected to the main body and the support body.

It should be appreciated that above description is merely for illustrative purposes and are not intended to limit the scope of the disclosure

DETAILED DESCRIPTION

Figure 1:
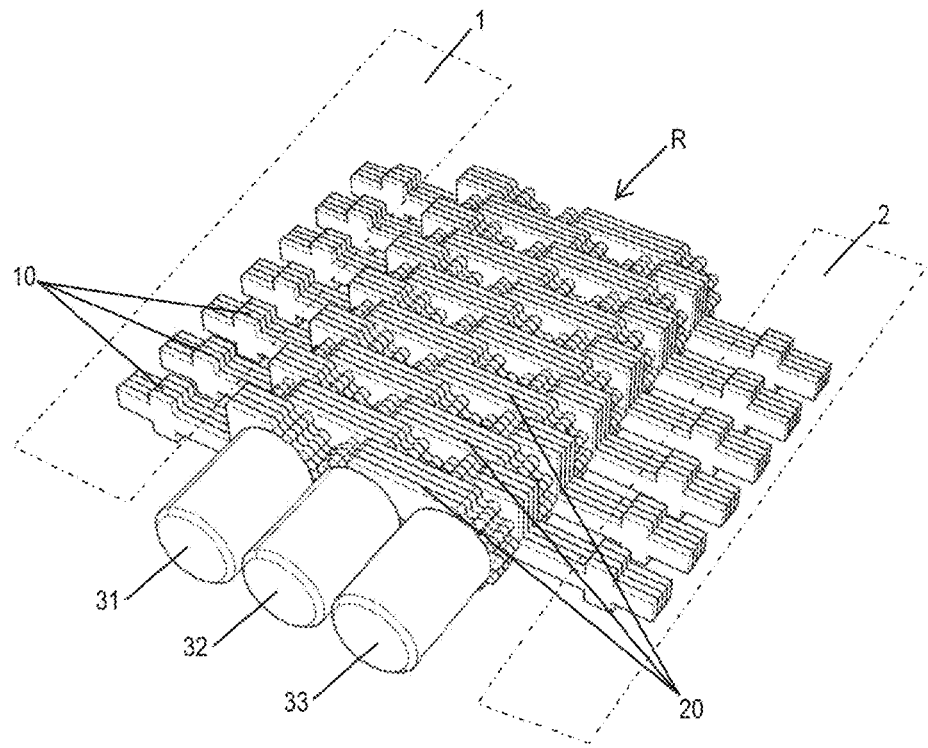
FIG. 1 is a schematic three-dimensional view showing a connector according to a preferred embodiment of the present disclosure.

Foregoing and other technical solutions, features and advantages of the present disclosure will become apparent from the detailed description hereinafter in conjunction with accompanying drawings. The terms, such as "on", "under", "left", "right", "front", "back", or the like, which are used in embodiments hereinafter, are used to indicate directions of drawings. Therefore, direction terms are for illustration purposes and are not intended to limit the present disclosure. Also, same reference numbers indicate same elements.

Various exemplary embodiments of the present disclosure will be described hereinafter referring to the drawings.

Figure 2:
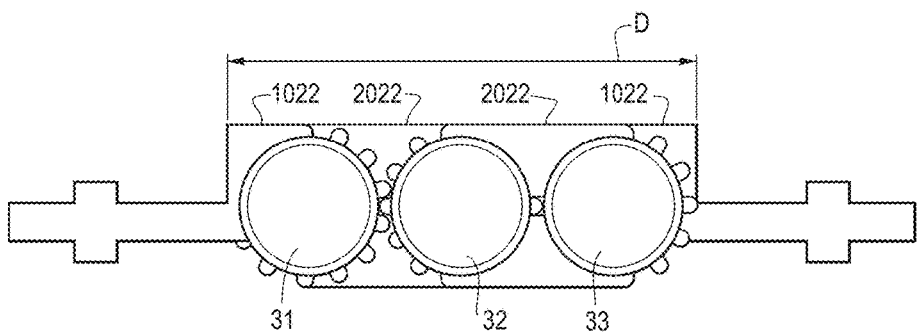
FIG. 2 is a side view of the connector shown in FIG. 1.
Figure 3:
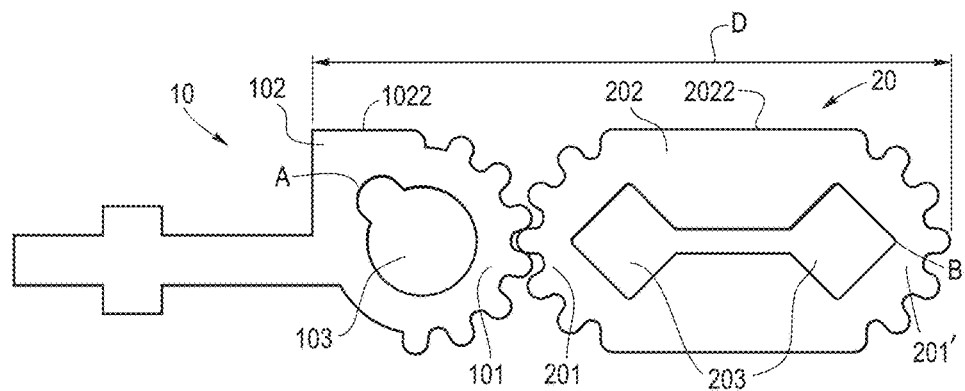
FIG. 3 is a schematic view showing two toothed sheets engaging with each other in the connector shown in FIG. 1.

First, referring to FIGS. 1-3 to describe the structure of the connector according to a preferred embodiment of the present disclosure, wherein FIG. 1 is a schematic three-dimensional view showing the connector according to the embodiment, FIG. 2 is a side view of the connector shown in FIG. 1, and FIG. 3 is a schematic view showing two connecting sheets engaging with each other in the connector shown in FIG. 1.

As shown in FIG. 1, the connector R according to this embodiment is used to realize mutual rotating between the main body 1 (schematically represented by a dashed rectangle in FIG. 1) and the support body 2 (schematically represented by a dashed rectangle in FIG. 1) of the electronic product. The electronic device may be, for example, a laptop, in this case, the main body 1 is a display part of the laptop, and the support body 2 is a keyboard part of the laptop. The electronic device may also be, for example, a pad computer (it will be described later in detail referring to FIGS. 4-7), in this case, the main body 1 is a touch sensitive display of the pad computer, and the support body is a supporting component rotatably connected to the back of the touch sensitive display by the connector R so as to support the pad computer on the platform. It should be noted that applications of the connector are not limited to laptops and pad computers, but it can also be applied to other electronic devices, even other non-electronic devices, which all fall within the scope of inventive concept of the present disclosure.

As shown in FIGS. 1-3, the connector R according to the exemplary embodiment is used to rotatably connect a main body 1 with a support body 2 of an electronic device, and the connector R comprises a first connecting sheet 10 and a second connecting sheet 20 engaging with each other, wherein, the peripheral edge of the first connecting sheet 10 (referred as "the first peripheral edge" hereinafter for ease of description) comprises a first connecting portion 101 having teeth and a first non-connecting portion 102 without teeth, and the second peripheral edge of the second connecting sheet 20 (referred as "the second peripheral edge" hereinafter for ease of description) comprises a second connecting portion 201 having teeth and a second non-connecting portion 202 without teeth. At least a portion of the first non-toothed portion 102 is formed as a first smooth surface 1022, and when the connector R is mounted between the main body 1 and the support body 2 of the electronic device, the first smooth surface 1022 is exposed outward. That is, the first smooth surface 1022 may be an external planar surface. With this, since the first smooth surface is exposed outward, i.e. faces the user or is exposed to the user, the smooth surface gives the user a good visual experience, and it will feel good when the user intentionally or unintentionally touch the smooth surface. Furthermore, the connection is realized by connecting sheets and the connecting sheets can be easily manufactured from for example metal at low cost, and when the connector is made of metal, the appearance and touching feeling would be pleasant, thereby significantly enhancing the user experience.

Further, alternatively or additionally, at least, a portion of the second non-toothed portion 202 is formed as a second smooth surface 2022, and when the connector R is mounted between the main body 1 and the support body 2 of the electronic device, the second smooth surface 2022 is exposed outward. That is, the second smooth surface 2022 may be an external planar surface. More particularly, referring to FIG. 2, the smooth surfaces 1022, 2022 are higher than teeth of the connecting portions 1022, 2022, and therefore, when the user touches the connector with his/her hands, he or she touches the smooth surface 1022, 2022 more rather than teeth despite of the presence of teeth in the connector, thus has a good touching feeling. As shown in the orientation of FIGS. 1-3, when viewed along the axes of the first, second, and third shafts 31, 32, and 33, the staggered surfaces 1022 and 2022 have the same height and so the surfaces 1022 and 2022 lie in a common plane and define a flat planar surface that extends a distance D from past an exterior end A of the first shaft hole to past an exterior end B of the third shaft hole. Of course, surface of each tooth may also preferably be manufactured to be smooth such that the user feels good in case touching it.

It is noted that, in FIG. 3, the second connecting sheet 20 has a symmetrical structure, i.e., has a connecting portion 201 on the left and a connecting portion 201' on the right, such symmetrical structure has some advantages in manufacture and assembling, for example, either side of the second connecting sheet 20 can cooperate with the first connecting sheet 10, so installation is feasible from either side. However, in principle, the connecting portion 201' on the right of the connecting sheet 20 does not cooperate or engage with the first connecting sheet 10, therefore, the connecting portion 201' may have no teeth on the right, but may have any other shape or structure, e.g., a semicircular shape or structure.

With further reference to FIG. 1, the connector according to this embodiment further comprises a first shaft 31, a second shaft 32 and a third shaft 33 parallel to each other, and the second shaft 32 is located between the first shaft 31 and the third shaft 33. The first connecting sheet 10 has a shaft hole 103 and the second sheet 20 has two shaft holes 203 (see FIG. 3). The first connecting sheet 10 is arranged as such that the first shaft 31 or the third shaft 33 goes through it, and the second connecting sheet 20 is arranged as such that the second shaft 32 and the third shaft 33 go through it, or the first shaft 31 and the second shaft 32 go through it. More particularly, some of the first connecting sheets 10 in the connector are arranged around the first shaft 31, and the rest are arranged around the third shaft 33, and the first connecting sheet 10 may be connected to the main body 1 or the support body 2 of the device; the second tooth sheet 20 is not directly connected the main body 1 or the support body 2 of the device but just arranged around the shafts. More specifically, see FIG. 1, on each of the first shaft 31, the second shaft 32 and the third shaft 33 is alternatively provided with the first connecting sheets and the second connecting sheets in manner of one or one group (in FIG. 1, one group) of first connecting sheets 10, then one or one group (in FIG. 1, one group) of second connecting sheets 20, and then one or one group (in FIG. 1, one group) of first connecting sheets 10, as such. With this, as shown in FIG. 1, these connecting sheets and shafts can be connected together only by mutually fitting between the sheets and the shafts, without the aid of any additional connecting components. Therefore, the connector of the present disclosure is simple, and this novel design in practical applications may also enable smooth rotation of the connector, and allow the user touching the smooth surface 1022, 2022 rather than the teeth more likely. Further, it can be seen that the connector of the present embodiment has three or at least three shafts, while that of prior art often has two shafts, and therefore, the connector of the present embodiment has a novel structure and gives a fresh appearance, thus it is more favored by users, especially young users. And, an idea of smooth surface is also included in such novel design, which solves problems of the prior art that some new designs do have novel structure but they do not give attention to the user's visual experience or touching feeling. Further, in the present embodiment, since the second connecting sheet has one more shaft hole than the first connecting sheet, i.e., in fact, the second connecting sheet is designed to be longer than the first connecting sheet in a direction perpendicular to the shaft, whereby a large area of smooth surface is easier to be realized, so that the user may have a good visual experience and touching feeling.

Figure 4:
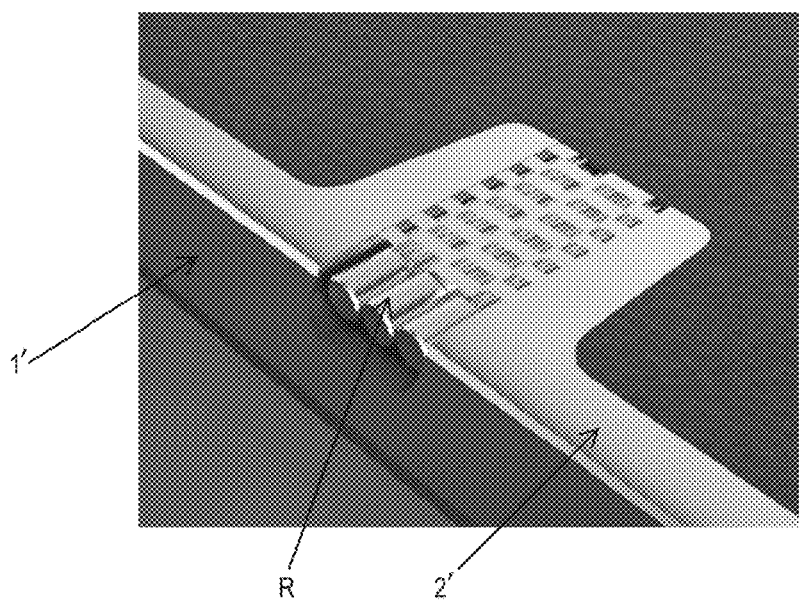
FIG. 4 is a partial schematic three-dimensional view showing a pad computer according to a preferred embodiment of the present disclosure.
Figure 5:
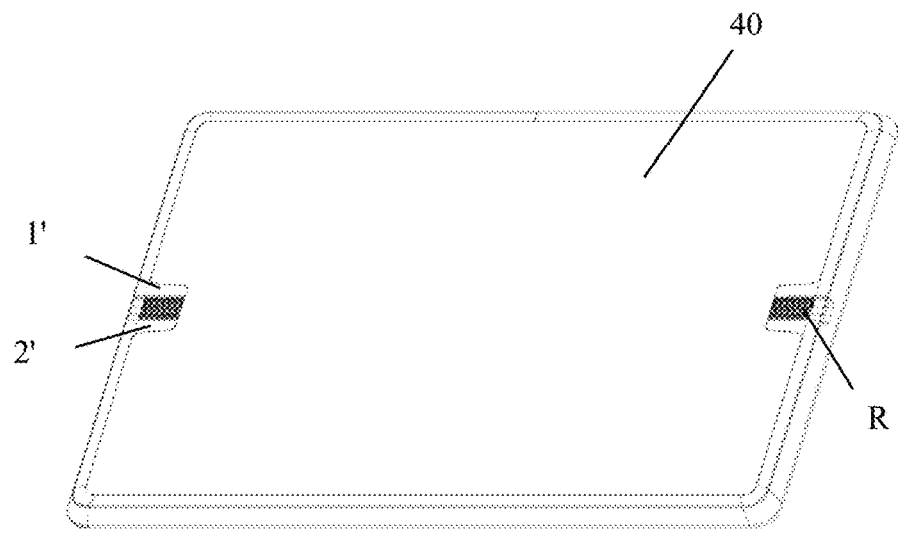
FIG. 5 is an overall three-dimensional view of the pad computer shown in FIG. 4, where the main body and the support body of the pad computer form an angle of 180 degrees.
Figure 6:
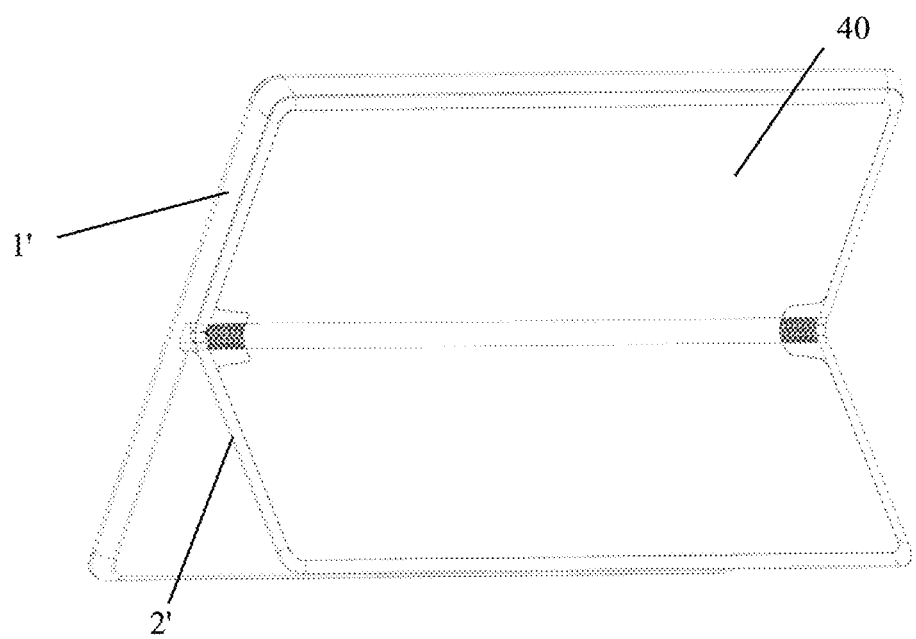
FIG. 6 is an overall three-dimensional view of the pad computer shown in FIG. 4, where the main body and the support body of the pad computer form an obtuse angle.
Figure 7:
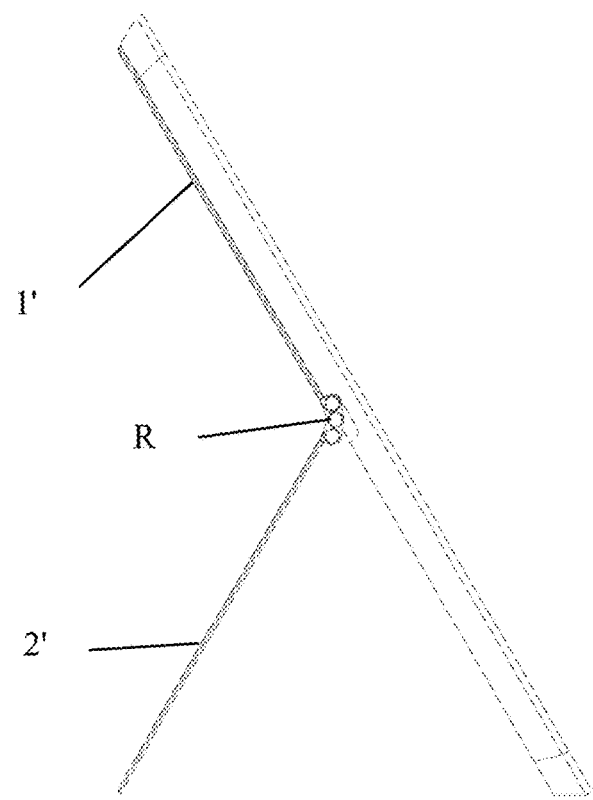
FIG. 7 is a side view of the pad computer shown in FIG. 6.

Referring to FIGS. 4-7, further describe an example of the connector according to a preferred embodiment of the present disclosure applied in a pad computer, wherein FIG. 4 shows a partial three-dimensional view of a pad computer according to a preferred embodiment of the present disclosure; FIG. 5 shows an overall three-dimensional schematic view of the pad computer shown in FIG. 4, wherein the main body, i.e. the touch sensitive display and the support body forms an angle of 180 degrees; FIG. 6 shows an overall three-dimensional schematic view of the pad computer shown in FIG. 4, wherein the main body and the support body are at an obtuse angle; and FIG. 7 is a side view of the pad computer shown in FIG. 6. It should be noted that the connector of the present disclosure can not only be applied to a pad computer, but also can be applied to be mounted between the screen part and keyboard part of a laptop as previously described, and can also be applied to other devices, as long as the device has/needs two parts/members rotatable with each other.

As shown in FIG. 4, the connector R as shown in FIGS. 1-3 is rotatably connected between the main body 1' (i.e. the touch sensitive display) and support body 2' of the pad computer, and the support body 2' and the connector R are located at the back of the pad computer. As can be seen from the figure, a smooth surface of the connector R is exposed outward, and the entire connector R has a good appearance.

Referring to FIG. 5, the pad computer comprises two connectors R rotatably connected between the main body 1' and the support body 2', each of which is provided at one end of the pad computer. In the exemplary embodiment, the upper half of the main body 1' (i.e. the part above a connecting line through the two connectors R in FIG. 5) has a greater thickness than that of the lower half of the main body 1' (i.e. the part below a connecting line through the two connectors R in FIG. 5), and the thickness of the support body 2' is exactly equal to the thickness difference between the upper half and the lower half of the main body 1', so that when the support body 2' is folded and closed onto the main body 1', the entire pad computer presents a uniform thickness, which is very beautiful, and facilitates the pad computer lying on a support platform such as desktop. Of course, the present disclosure is not limited thereto, and the support body 2' may have other shapes and sizes.

Continuing to refer to FIG. 5, the pad computer according to this embodiment further comprises a cover 40 which covers the outer side of the main body 1' and the outer side of the support body 2' together, but does not cover the first smooth surface and the second smooth surface of the connector R. Of course, the cover 40 of the present disclosure may only expose one of the first smooth surface and the second smooth surface of the connector R. Preferably, the cover is of an integral structure and may be made of leather, rubber, cloth, carbon fiber, plastic or metal or a combination thereof. Thus, in the help of the cover 40, the entire pad computer of the present invention looks more beautiful and expensive, and has good wear resistance.

Referring to FIGS. 6 and 7, it can be seen that the pad computer may be supported at any desired angle by adjusting the angle of the support body 2' relative to the main body of the main body 1'. By means of the connector R of the present disclosure, the support body 2' can rotate 0-360 degrees smoothly, and the pad computer of the present disclosure is more beautiful and durable thanks to the cover 40 of the present disclosure.

Finally, it should be noted that, although in the various embodiments, the present disclosure has been described in the specification and are illustrated in the accompanying drawings, those skilled in the art will appreciate that the above-described embodiments are merely preferred embodiments, and some technical features in the embodiments may be not necessary for solving a specific technical problem, which can be removed or omitted without affecting the resolution to the technical problems; also, features, elements and/or functions of one embodiment can be combined, composited, cooperated with features, elements and/or functions of one or more other embodiments, unless the combination, composition or cooperation cannot be implemented.

The invention claimed is:

1. A connector comprising:
a first shaft, a second shaft, and a third shaft parallel to each other, with the second shaft located between the first shaft and the third shaft;
a plurality of first connecting sheets, each having a single first shaft hole and comprising a first connecting portion and a first non-connecting portion, with the plurality of first connecting sheets arranged such that some of the plurality of first connecting sheets are arranged such that the first shaft goes through each single first shaft hole of the some of the plurality of first connecting sheets, and another one of the plurality of first connecting sheets is arranged such that the third shaft goes through the single first shaft hole of the another one of the plurality of first connecting sheets;
a plurality of second connecting sheets, each having a second shaft hole and a third shaft hole that is spaced from the second shaft hole and comprising a second connecting portion and a second non-connecting portion, with at least some of the plurality of the second connecting sheets arranged such that the second and third shafts pass through the second shaft hole and the third shaft hole, respectively, and with another one of the plurality of second connecting sheets arranged such that the first and second shafts pass through the second shaft hole and the third shaft hole, respectively, of the another one of the plurality of second connecting sheets;
wherein, each of the first and second connecting portions of the first and second connecting sheets, respectively, comprises a plurality of teeth for mutual engagement and cooperation to effect a relative rotary motion of the first and second plurality of connecting sheets, and each of the first and second non-connecting portions of the first and second connecting sheets, respectively, comprises a first external planar surface and a second external planar surface so that in one configuration of the connector, the first external planar surface and the second external planar surface of the first and second non-connecting portions lie in a common plane to define a flat planar surface that extends a distance from past an exterior end of the first shaft hole to past an exterior end of the third shaft hole, wherein the external surface is at a distance from respective shaft holes that is greater than a distance the plurality of teeth are from the respective shaft holes.

2. The connector according to claim 1, wherein the first shaft, the second shaft, and the third shaft are alternatively provided with a set of the plurality of first connecting sheets and a set of the plurality of second connecting sheets.

3. The connector according to claim 1, wherein for each of the plurality of first connecting sheets, the plurality of teeth are arranged at a peripheral edge of the first connecting sheet.

4. The connector according to claim 1 wherein the at least some of the plurality of the second connecting sheets are arranged such that when the first shaft passes through each single first shaft hole of the plurality of first connecting sheets, the second and third shafts pass through each second shaft hole and third shaft hole, respectively, of the at least some of the plurality of the second connecting sheets, and at least a second some of the plurality of the second connecting sheets are arranged such that when the first shaft passes through each single first shaft hole of the plurality of first connecting sheets, the first and second shafts pass through each second shaft hole and third shaft hole, respectively, of the second some, of the plurality of the second connecting sheets.

5. The connector according to claim 4 wherein for the plurality of first connecting sheets, each first connecting sheet comprises: a first end with the connecting portion and a second end, opposite the first end, with the non connecting portion and wherein for the plurality of second connecting sheets, each second connecting sheet comprises: a first end with the connecting portion and a second end, opposite the first end, with the connecting portion.

6. The connector according to claim 5 where for each of the plurality of second connecting sheets, the non-connecting portion of the second connecting sheet is disposed between the first end of the second connecting sheet and the second end of the second connecting sheet.

7. An electronic device, comprising:
a main body;
a support body for supporting the main body; and
a connector rotatably connected to the main body and the support body, wherein the connector comprises:
a first shaft, a second shaft, and a third shaft parallel to each other, with the second shaft located between the first shaft and, the third shaft;
a plurality of first connecting sheets, each having a single first shaft hole and comprising a first connecting portion and a first non-connecting portion, with the plurality of first connecting sheets arranged such that some of the plurality of first connecting sheets are arranged such that the first shaft goes through each single first shaft hole of the some of the plurality of first connecting sheets, and another one of the plurality of first connecting sheets is arranged such that the third shaft goes through the single first shaft hole of the another one of the plurality of first connecting sheets;
a plurality of second connecting sheets, each having a second shaft hole and a third shaft hole that is spaced from the second shaft hole and comprising a second connecting portion and a second non-connecting portion, with at least some of the plurality of the second connecting sheets arranged such that the second and third shafts pass through the second shaft hole and the third shaft hole, respectively, and with another one of the plurality of second connecting sheets arranged such that the first and second shafts pass through, the second shaft hole and the third shaft hole, respectively, of the another one of the plurality of second connecting sheets;
wherein, each of the first and second connecting portions of the first and second connecting sheets, respectively, comprises a plurality of teeth for mutual engagement and cooperation to effect a relative rotary motion of the first and second plurality of connecting sheets, and each of the first and second non-connecting portions of the first and second connecting sheets, respectively, comprises a first external planar surface and a second external planar surface so that in one configuration of the connector, the first external planar surface and the second external planar surface of the first and second non-connecting portions lie in a common plane to define a flat planar surface that extends a distance from past an exterior end of the first shaft hole a to past an exterior end of the third shaft hole,
wherein the external surface is at a distance from respective shaft holes that is greater than a distance the plurality of teeth are from the respective shaft holes.

8. The electronic device according to claim 7, wherein, the electronic device comprises a second connector that is identical to the connector, wherein the connector and the second connector are each provided at one end of the electronic device.

9. The electronic device according to claim 7, wherein the electronic device is a laptop, the main body is a display part of the laptop, and the support body is a keyboard part of the laptop.

10. The electronic device according to claim 7, wherein the electronic device is a pad computer, the main body is a touch sensitive display of the pad computer, and the support body is rotatably connected to the back of the touch sensitive display via the connector so as to support the electronic device on a platform.

11. The electronic device according to claim 10, wherein the electronic device further comprises a cover that covers an outer side of the touch sensitive display and an outer side of the support body together.

12. The electronic device according to claim 11, wherein the cover is of an integral structure.

13. The electronic device according to claim 11, wherein the cover is made of leather, rubber, cloth, carbon fiber, plastic or metal or a combination thereof.

14. A connector comprising:
a first shaft, a second shaft, and a third shaft parallel to each other, with the second shaft located between the first shaft and the third shaft;
a plurality of first connecting sheets, each having a single first shaft hole, wherein some of the plurality of first connecting sheets are arranged so the first shaft passes through each single shaft hole of the some of the plurality of first connecting sheets, and another one the plurality of first connecting sheets is arranged so the third shaft goes through the single first shaft hole of the another one of the plurality of first connecting sheets;
a plurality of second connecting sheets having a second shaft hole and a third shaft hole that is spaced from the second shaft hole and arranged so that when the first shaft passes through the single first shaft hole the second shaft and the third shaft pass through the second shaft hole and the third shaft hole, respectively, of each of at least some of the plurality of second connecting sheets, and so that when the third shaft passes through the single first shaft hole, the first shaft and the second shaft pass through each of the second shaft hole and the third shaft hole, respectively, of the some of the plurality of second connecting sheets;
wherein the plurality of first connecting sheets and the plurality of second connecting sheets are arranged in an alternating manner along a length of the first, second and third shafts,
wherein each of the first and second connecting sheets, respectively, comprises a first external planar surface and a second external planar surface;
wherein for one configuration, each of the first and second connecting sheets comprises: a plurality of teeth,
wherein the first external planar surface and the second external planar surface define a flat planar surface that extends a distance from past an exterior end of the first shaft hole to past an exterior end of the third shaft hole,
wherein a distance of the flat planar surface from respective shaft holes is greater than a distance the plurality of teeth are from the respective shaft holes.

15. The connector according to claim 14 wherein each of the plurality of first connecting sheets and the plurality of second connecting sheets comprises a plurality of teeth for mutual engagement and cooperation to effect a relative rotary motion of the plurality of first connecting sheets and the plurality of second connecting sheets.

16. The connector according to claim 14 wherein for the plurality of first connecting sheets, each first connecting sheet comprises: a first end with a connecting portion and a second end, opposite the first end, with a non-connecting portion and wherein for the plurality of second connecting sheets, each second connecting sheet comprises: a first end with a connecting portion and a second end, opposite the first end, with a connecting portion.

17. The connector according to claim 16 wherein for each of the plurality of second, connecting sheets, the non-connecting portion of the second connecting sheet is disposed between the first end of the second connecting sheet and the second end of the second connecting sheet.

18. The connector according to claim 17 wherein each of the first external planar surface and the second external planar surface is at a distance from respective shaft holes that is greater than a distance the plurality of teeth are from the respective shaft holes so that in the one configuration each of the first external planar surface and the second external planar surface lie in a common plane to define the flat planar surface.

* * * * *